United States Patent
Repasi et al.

(10) Patent No.: US 10,427,657 B2
(45) Date of Patent: Oct. 1, 2019

(54) SOLENOID VALVE DEVICE HAVING A LIFTING ROD FOR ACTUATING A VALVE BODY

(71) Applicant: Robert Bosch GmbH, Stuttgart (DE)

(72) Inventors: Balint Janos Repasi, Hernadnemeti (HU); Georg Reeb, Buehl Eisental (DE); Markus Hartinger, Strasbourg (FR); Rachid Chamoue, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/848,087

(22) Filed: Dec. 20, 2017

(65) Prior Publication Data

US 2018/0170332 A1 Jun. 21, 2018

(30) Foreign Application Priority Data

Dec. 21, 2016 (DE) ........................ 10 2016 225 731

(51) Int. Cl.
*F16K 31/06* (2006.01)
*B60T 8/36* (2006.01)
*F15B 13/08* (2006.01)

(52) U.S. Cl.
CPC .......... *B60T 8/365* (2013.01); *F16K 31/0655* (2013.01); *F16K 31/0665* (2013.01); *F16K 31/0675* (2013.01); *F16K 31/0693* (2013.01); *F15B 13/0889* (2013.01); *F16K 31/0651* (2013.01)

(58) Field of Classification Search
CPC .. B60T 8/365; F16K 31/0655; F16K 31/0693; F16K 31/0675; F16K 31/0665; F16K 31/0651; F15B 13/0889

USPC ......... 251/129.07, 129.15, 282, 30.03–30.04
See application file for complete search history.

(56) References Cited

U.S. PATENT DOCUMENTS

| | | | | |
|---|---|---|---|---|
| 2,623,542 A | * | 12/1952 | Obermaier | F16K 31/404 251/30.03 |
| 3,945,399 A | | 3/1976 | Tirelli | |
| 4,390,158 A | * | 6/1983 | Lang | F16K 31/0693 251/129.15 |
| 4,852,853 A | * | 8/1989 | Toshio | F16K 31/0693 251/129.07 |
| 4,921,208 A | * | 5/1990 | LaMarca | F16K 31/0693 251/39 |
| 5,170,987 A | * | 12/1992 | Krauss | F02M 51/0682 239/585.4 |

(Continued)

FOREIGN PATENT DOCUMENTS

| | | |
|---|---|---|
| DE | 102008042801 A1 | 4/2009 |
| DE | 102010000901 | 6/2011 |
| EP | 0928892 A1 | 7/1999 |

*Primary Examiner* — John Bastianelli
(74) *Attorney, Agent, or Firm* — Michael Best & Friedrich LLP

(57) ABSTRACT

A valve device, in particular solenoid valve device, having at least one throughflow region (12), having at least one valve seat (14) and having an actuating unit (16) which has at least one valve body (18), at least an actuating element (20) provided for transmitting an actuation force to the valve body (18), and at least one first ventilation opening (24) arranged outside a fluid contact region (22) of the actuating element (20). The actuating unit (16) has at least one second ventilation opening (26, 28) arranged outside the fluid contact region (22) of the actuating element (20).

9 Claims, 7 Drawing Sheets

(56) References Cited

U.S. PATENT DOCUMENTS

| | | | | |
|---|---|---|---|---|
| 5,232,167 | A * | 8/1993 | McCormick | F02M 51/0671 239/585.1 |
| 5,402,093 | A * | 3/1995 | Gibas | H01F 7/081 251/129.07 |
| 5,443,241 | A * | 8/1995 | Odaira | B60H 1/00485 137/625.5 |
| 5,918,856 | A * | 7/1999 | Scharnowski | F16K 31/0658 251/129.07 |
| 6,315,268 | B1 * | 11/2001 | Cornea | F16K 31/0613 137/625.65 |
| 6,454,191 | B1 * | 9/2002 | Spakowski | F02M 51/0625 251/129.21 |
| 6,752,371 | B2 * | 6/2004 | Herbert | E03D 1/36 251/129.17 |
| 7,097,151 | B2 * | 8/2006 | Akabane | F02M 51/005 251/129.18 |
| 2008/0257419 | A1 * | 10/2008 | Tsuduki | F16K 31/0651 137/455 |
| 2011/0147628 | A1 | 6/2011 | Kurz | |
| 2014/0070028 | A1 | 3/2014 | Rochas et al. | |
| 2016/0290299 | A1 | 10/2016 | Aritomi et al. | |

* cited by examiner

SOLENOID VALVE DEVICE HAVING A LIFTING ROD FOR ACTUATING A VALVE BODY

BACKGROUND OF THE INVENTION

Solenoid valves are already known which have a lifting rod for actuating a valve body. Such lifting rods are formed for example as high-grade steel tubes and, in a region of the lifting rod which is arranged within a region of the valve through which flow passes, have a transverse bore for ventilation purposes, via which transverse bore the throughflow region is connected, through an interior space of the lifting rod, to an interior region of an electromagnetic drive.

SUMMARY OF THE INVENTION

The invention is based on a valve device, in particular solenoid valve device, having at least one throughflow region, having at least one valve seat and having an actuating unit which has at least one valve body, at least an actuating element provided for transmitting an actuation force to the valve body, and at least one first ventilation opening arranged outside a fluid contact region of the actuating element.

It is proposed that the actuating unit has at least one second ventilation opening arranged outside the fluid contact region of the actuating element.

A "valve device" is to be understood in particular to mean an in particular functional constituent part, in particular a structural and/or functional component, of a valve, in particular of an automated and/or partially automated valve, advantageously of a solenoid valve, in particular for at least one fluid, advantageously for at least one liquid. The valve device preferably has at least one actuator unit which is provided for generating an actuation force in accordance with demand. The actuator unit is preferably formed as an electromagnetic drive. In particular, the actuator unit comprises at least one, in particular magnetic, armature, which is advantageously connected, in particular directly, to the actuating element. Furthermore, the actuator unit advantageously comprises at least one drive element, which is preferably formed as an inductance, in particular at least one coil, which at least partially, particularly preferably entirely, surrounds the armature. It is advantageous for a position of the drive element relative to a housing of the valve device and/or of the actuator unit to be constant. In particular, the armature is movable relative to the drive element. The drive element is preferably provided for moving the armature in accordance with demand, in particular in a direction parallel to a longitudinal direction of the actuating element. The actuator unit is advantageously provided for moving the valve body in a manner dependent on an operating state, in particular away from the valve seat or toward the latter, preferably in order to generate an opened state or a closed state or one or more different partially opened states. In particular, the valve body closes off a throughflow opening of the valve seat in the closed state and/or opens up said throughflow opening at least partially in the opened or partially opened state. "Provided" is to be understood in particular to mean specially programmed, designed and/or equipped. The statement that an object is provided for a particular function is to be understood in particular to mean that the object carries out and/or performs said particular function in at least one usage and/or operating state.

In particular, the first ventilation opening is arranged in a region of the actuator unit. The first ventilation opening is advantageously arranged in a region averted from the throughflow region, in particular in an end region, of the actuating unit, in particular of the actuating element. The actuating element preferably has the first ventilation opening. It is particularly preferable for the first ventilation opening to open into a rear interior region, which in particular in the closed state is arranged behind the armature as viewed from the throughflow region, of the actuator unit. In particular, the armature is arranged at least partially in the rear interior region of the actuator unit in the opened and/or in the partially opened state, and/or is arranged outside the rear interior region of the actuator unit in the closed state. In particular, the first ventilation opening is provided for permitting a pressure equalization in the rear interior region of the actuator unit owing to a movement of the armature. The first ventilation opening is advantageously provided for permitting a pressure equalization and/or an exchange of fluid between the rear interior region of the actuator unit and the throughflow region. In particular, an opening direction of the first ventilation opening runs at least substantially parallel to a main direction of extent of the actuating element. It is however also conceivable for an opening direction of the first ventilation opening to run at an angle, in particular at right angles, to the main direction of extent of the actuating element. Here, an "opening direction" of an opening is to be understood in particular to mean a direction parallel to a surface normal with respect to the opening and/or parallel to a main plane of extent of the opening. A "main plane of extent" of an object is to be understood in particular to mean a plane which is parallel to a largest side surface of a smallest imaginary cuboid just fully enclosing the object, and which in particular runs through the central point of the cuboid.

The valve body and/or the valve seat is advantageously equipped with at least one sealing element, in particular a sealing ring, which is preferably provided for permitting a sealed seat of the valve body in the valve seat. A high level of cost-effectiveness can be achieved if the valve body is at least partially, advantageously at least to a major extent, in particular in terms of a volume fraction and/or in terms of a weight, particularly advantageously entirely, formed in particular from plastic which has at least one hard component, in particular from a plastics mixture. The expression "at least to a major extent" is to be understood here in particular to mean at least 55%, advantageously at least 65%, preferably at least 75%, particularly preferably at least 85% and particularly advantageously at least 95%, but in particular also entirely.

The actuating element is preferably provided for transmitting the actuation force from the actuator unit to the valve body. In particular, the actuating element is of rod-like form. The actuating element is advantageously formed as a lifting rod. The valve device preferably comprises at least one flow housing which defines the throughflow region. In particular, the flow housing has at least one inlet and at least one outlet. The valve seat is advantageously arranged between the inlet and outlet. The valve body is particularly advantageously arranged downstream of the valve seat as viewed from the inlet. The throughflow region is preferably a region of the flow housing which is flowed through by a fluid in an opened or partially opened state.

In particular, the fluid contact region comprises at least one section of the actuating element which, in at least one operating state, is in contact with a fluid, in particular with a fluid flowing through the throughflow region. In particular, the fluid contact region comprises, advantageously exactly and/or only, one section of the actuating element, which is arranged within the throughflow region and outside the valve body. In particular, the second ventilation opening is arranged outside that section of the actuating element which is arranged within the throughflow region and outside the valve body. The second ventilation opening is advantageously connected to the throughflow region and/or arranged in the throughflow region.

Advantageous characteristics with regard to inexpensive production can be obtained by means of the design of the solenoid valve device according to the invention. Furthermore, assemblability can be simplified. Furthermore, a valve body and an actuating element can be quickly and easily connected, in particular without the need for precise setting of a rotational position. Furthermore, targeted ventilation can be made possible in a region of a sealing cone. Furthermore, a high level of robustness and/or low susceptibility to fouling, in particular with particles and/or sand, can be achieved. Furthermore, a clearance between a magnet armature and a sealing sleeve can be advantageously reduced.

In one advantageous embodiment of the invention, it is proposed that the valve body has the second ventilation opening. In particular, the valve body has at least one ventilation duct which connects an interior space of the valve body to the throughflow region, in particular through the second ventilation opening. In this way, ventilation can be improved, in particular on the basis of an increased suction action in a region of the valve body.

In an alternative embodiment of the invention, it is proposed that the actuating element has the second ventilation opening. The actuating element preferably has at least one ventilation leadthrough and/or at least one ventilation duct and/or at least one ventilation bore which, in particular, forms the second ventilation bore. In this case, the second ventilation opening advantageously opens into a front interior region of the actuator unit, which is arranged outside the throughflow region and/or, in particular in the opened state, in front of the armature, in particular between an armature seat of the armature and the armature, as viewed from the throughflow region. In particular, the armature is arranged spaced apart from the armature seat in the opened and/or in the partially opened state, and/or bears against said armature seat in the closed state. In particular, in this case, the second ventilation opening is provided for permitting a pressure equalization and/or an exchange of fluid between the rear interior region of the actuator unit and the front interior region of the actuator unit, in particular through the first ventilation opening and the second ventilation opening.

Here, the valve device according to the invention is not intended to be restricted to the usage and embodiment described above. In particular, the valve device according to the invention may have a number of individual elements, components and units which deviates from a number stated herein for performing a function described herein. Furthermore, in the case of the value ranges specified in this disclosure, values lying within the stated boundaries are also intended to be disclosed and usable as desired.

In a particularly advantageous embodiment of the invention, it is proposed that the actuating unit has at least one third ventilation opening arranged outside the fluid contact region of the actuating element. In particular, in this case, the second ventilation opening corresponds to the described ventilation opening of the valve body, and/or the third ventilation opening corresponds to the described second ventilation opening of the actuating element. In this way, ventilation and a pressure equalization and/or an exchange of fluid during switching of a solenoid valve can advantageously be made possible.

A simple design and/or a high level of component efficiency can be achieved if the actuating unit has at least one duct which connects at least two of the ventilation openings to one another. The duct advantageously extends at least substantially parallel or parallel to a main direction of extent of the actuating element. The duct particularly advantageously connects the first ventilation opening to the ventilation opening of the valve body and/or to the second ventilation opening of the actuating element. In particular, the duct connects the first ventilation opening, the second ventilation opening and the third ventilation opening. The second ventilation opening is preferably connected to the third ventilation opening and/or to the first ventilation opening via the ventilation duct of the valve body and the interior space of the valve body. The duct preferably has at least one first inlet opening, which is advantageously the first ventilation opening. The duct particularly preferably has at least one second inlet opening, which is advantageously arranged opposite the first inlet opening and which particularly advantageously opens into the interior space of the valve body. It is however also conceivable for the second inlet opening of the duct to correspond to the second ventilation opening of the actuating element. Here, "at least substantially parallel" is to be understood in particular to mean an orientation of a direction relative to a reference direction, in particular in a plane, wherein the direction has a deviation of in particular less than 8 degrees, advantageously less than 5 degrees and particularly advantageously less than 2 degrees in relation to the reference direction. Here, a "main direction of extent" of an object is to be understood in particular to mean a direction which runs parallel to a longest edge of a smallest imaginary cuboid just fully enclosing the object.

A high load capacity and/or a design which is inexpensive and/or efficient with regard to components can be obtained if the actuating element is of at least substantially tubular or tubular form. In this context, an "at least substantially tubular object" is to be understood in particular to mean an object with at least an elongate and/or duct-shaped interior space and at least one front and/or at least one rear inlet opening, wherein the interior space may be connected or connectable to surroundings via further openings, slots, gaps, bores, ducts, in particular with passage directions arranged perpendicular to a longitudinal direction of the object and/or of the interior space, for example a tube and/or a bar with a longitudinal bore and/or a hose, in particular also with transverse bores and/or lateral holes and/or slots or the like. In particular, the duct is formed as a longitudinal bore of the actuating element. The actuating element is preferably formed as a tube.

Inexpensive producibility and/or flexibility with regard to geometries that can be realized can be achieved if the actuating element is at least partially, advantageously at least to a major extent, in particular in terms of a volume fraction and/or in terms of a weight, particularly advantageously entirely, formed in particular from plastic which has at least one hard component, in particular from a plastics mixture.

Simple assembly and/or advantageous characteristics with regard to an orientation of an actuating element relative to a valve body can be achieved if the actuating element is connected in cohesive and/or positively locking fashion to the valve body. The valve body preferably forms at least one receiving region for the actuating element, into which the actuating element is advantageously pressed and/or inserted and/or which is connected to and/or encompasses the interior space of the valve body. In particular if the actuating element and the valve body are formed at least partially from plastic, it is conceivable for the actuating element and the valve body to be welded in particular by means of ultrasound welding. It is also conceivable for the actuating element and the valve body to be adhesively bonded to one another.

Efficient ventilation can be made possible if an opening direction of at least one of the ventilation openings, in particular of the second ventilation opening and/or of the third ventilation opening, is oriented at an angle, in particular at least substantially perpendicular, with respect to a longitudinal direction of the actuating element. Here, "at least substantially perpendicular" is to be understood in particular to mean an orientation of a direction relative to a reference direction, in particular in a reference plane, wherein the direction and the reference direction enclose an angle which deviates in particular by less than 8 degrees, advantageously by less than 5 degrees and particularly advantageously by less than 2 degrees, from a right angle.

Advantageous characteristics with regard to inexpensive production and/or effective ventilation can be achieved with a valve, in particular a solenoid valve, having at least one valve device according to the invention.

BRIEF DESCRIPTION OF THE DRAWINGS

Further advantages will emerge from the following description of the drawing. The drawing illustrates an exemplary embodiment of the invention. The drawing, the description and the claims contain numerous features in combination. A person skilled in the art will expediently also consider the features individually, and combine them to form meaningful further combinations.

DETAILED DESCRIPTION

Figure 1:
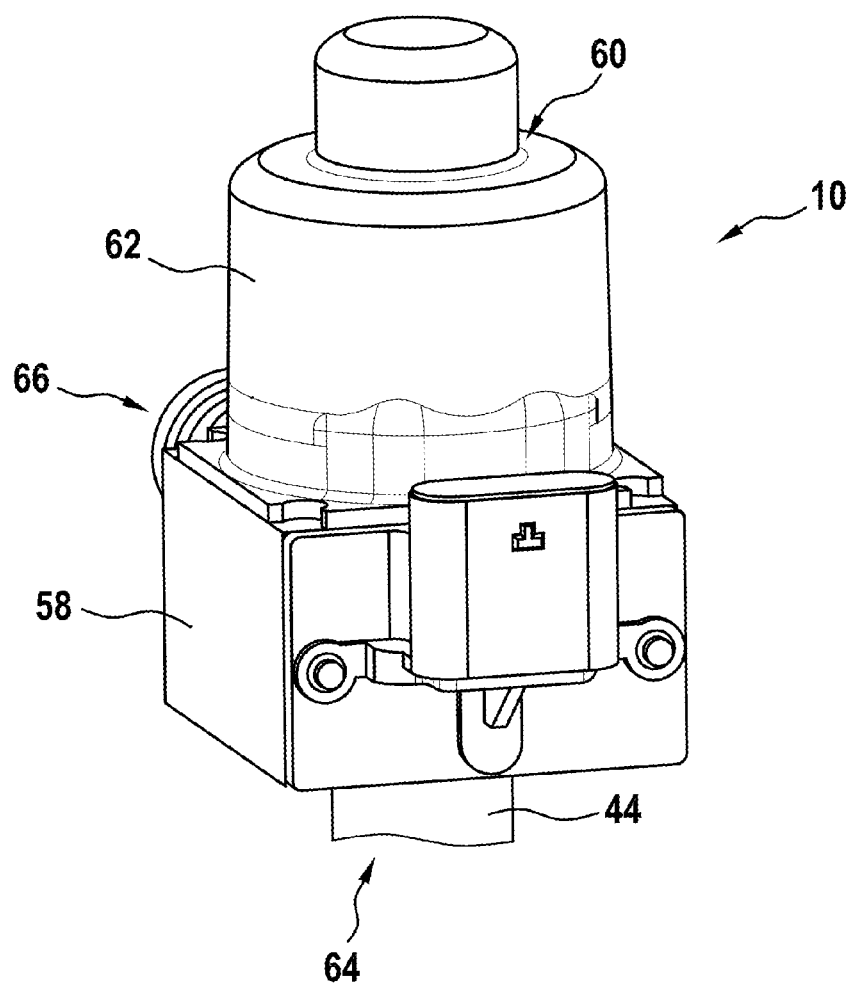
FIG. 1 shows a valve with a valve device in a perspective illustration.

FIG. 1 shows a valve 58 with a valve device 10 in a perspective illustration. The valve 58 is formed as a solenoid valve. The valve device 10 is formed as a solenoid valve device. The valve device 10 comprises, in the present case, a flow housing 44. The valve device 10 furthermore comprises an actuator unit 60 with a housing 62.

Figure 2:
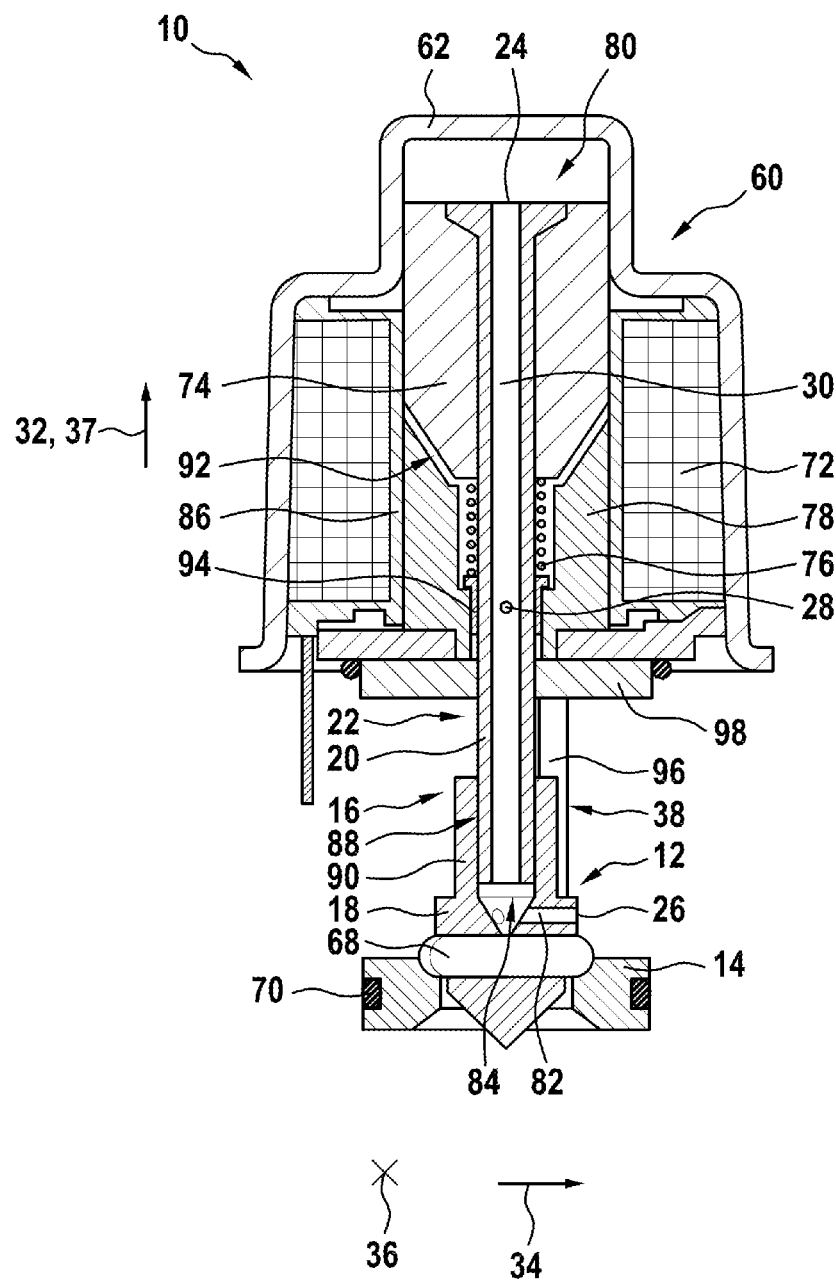
FIG. 2 shows the valve device in a closed state in a schematic sectional illustration.
Figure 3:
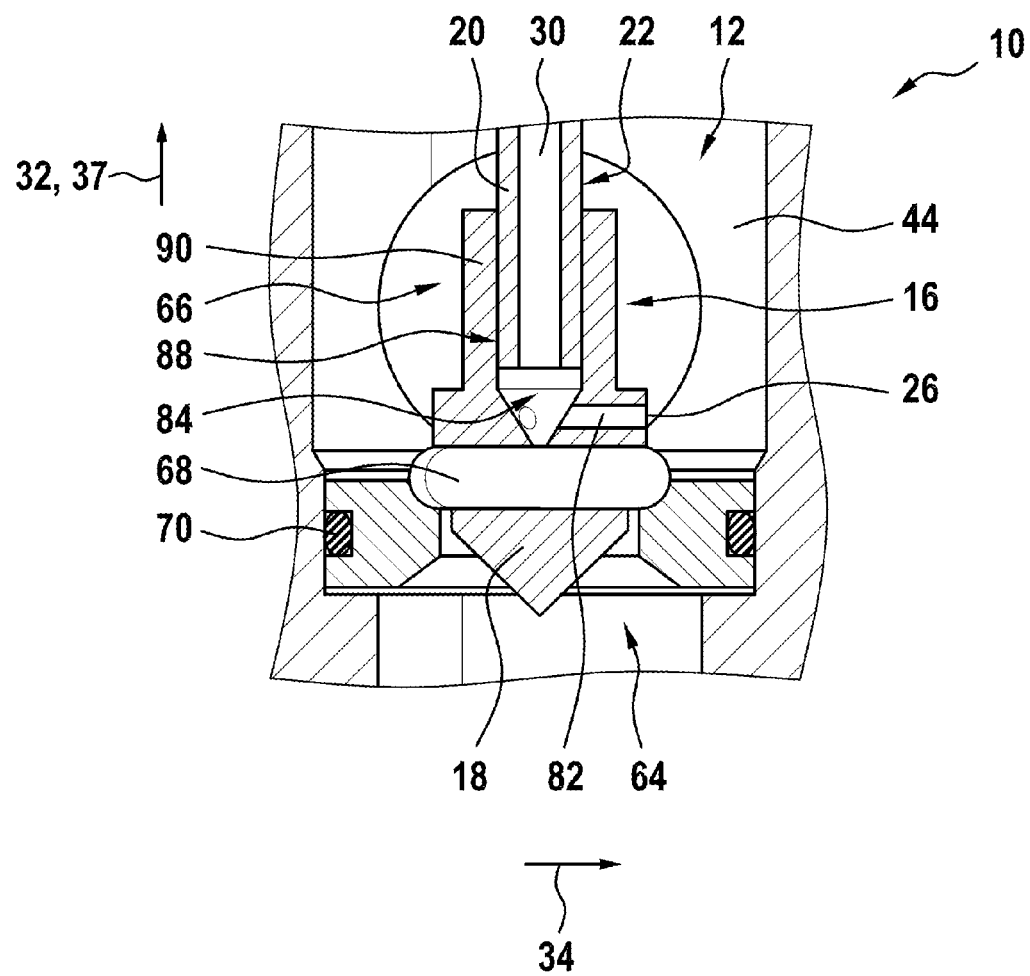
FIG. 3 shows a detail of the valve device in the closed state in a further schematic sectional illustration.

FIG. 2 shows the valve device 10 in a closed state in a schematic sectional illustration. The flow housing 44 is not illustrated in FIG. 2 for the sake of clarity. FIG. 3 shows a detail of the valve device 10 in the closed state in a schematic sectional illustration. The valve device 10 has at least one throughflow region 12. The throughflow region 12 is provided for a throughflow of a fluid. The flow housing 44 defines the throughflow region 12. Furthermore, the valve device 10 has at least one valve seat 14. Furthermore, the valve device 10 has an actuating unit 16 which comprises at least one valve body 18 and at least one actuating element 20, which is provided for transmitting an actuation force to the valve body 18. In the present case, the valve body 18 is formed as a sealing cone. Furthermore, in the present case, the actuating element 20 is formed as a lifting rod. Furthermore, the actuating unit 16 has at least one first ventilation opening 24 arranged outside a fluid contact region 22 of the actuating element 20. Furthermore, the actuating unit 16 has at least one second ventilation opening 26 arranged outside the fluid contact region 22 of the actuating element 20.

Furthermore, in the present case, the actuating unit 16 has a third ventilation opening 28 arranged outside the fluid contact region 22 of the actuating element 20. In the present case, the valve body 18 has the second ventilation opening 26. Furthermore, in the present case, the actuating element 20 has the third ventilation opening 28. It is however conceivable for an actuating unit to have, as second ventilation opening, analogously to that described herein, only one ventilation opening of a valve body or one ventilation opening of an actuating element.

The valve device 10 has an inlet 64 and an outlet 66. The valve seat 14 is arranged in front of the valve body 18 as viewed from the inlet 64. The outlet 66 is, as viewed from the inlet 64, arranged downstream of the valve seat 14. In the closed state, the valve body 18 is seated on the valve seat 14. In the present case, the valve body 18 is equipped with a sealing element 68 in order to advantageously permit a sealed closure. The sealing element 68 is formed as a sealing ring. In FIGS. 2 and 3, the sealing element 68 is not illustrated in section. Furthermore, the valve seat 14 has a further sealing element 70. The further sealing element 70 is provided for producing a sealed connection to the flow housing 44. In an opened and/or partially opened state, the valve body 18 is arranged so as to be lifted off from the valve seat 14. A fluid can then flow from the inlet 64 to the outlet 66, in particular through a gap which forms between the valve body 18 or the sealing element 68 and the valve seat 14 during an opening process.

Figure 4:
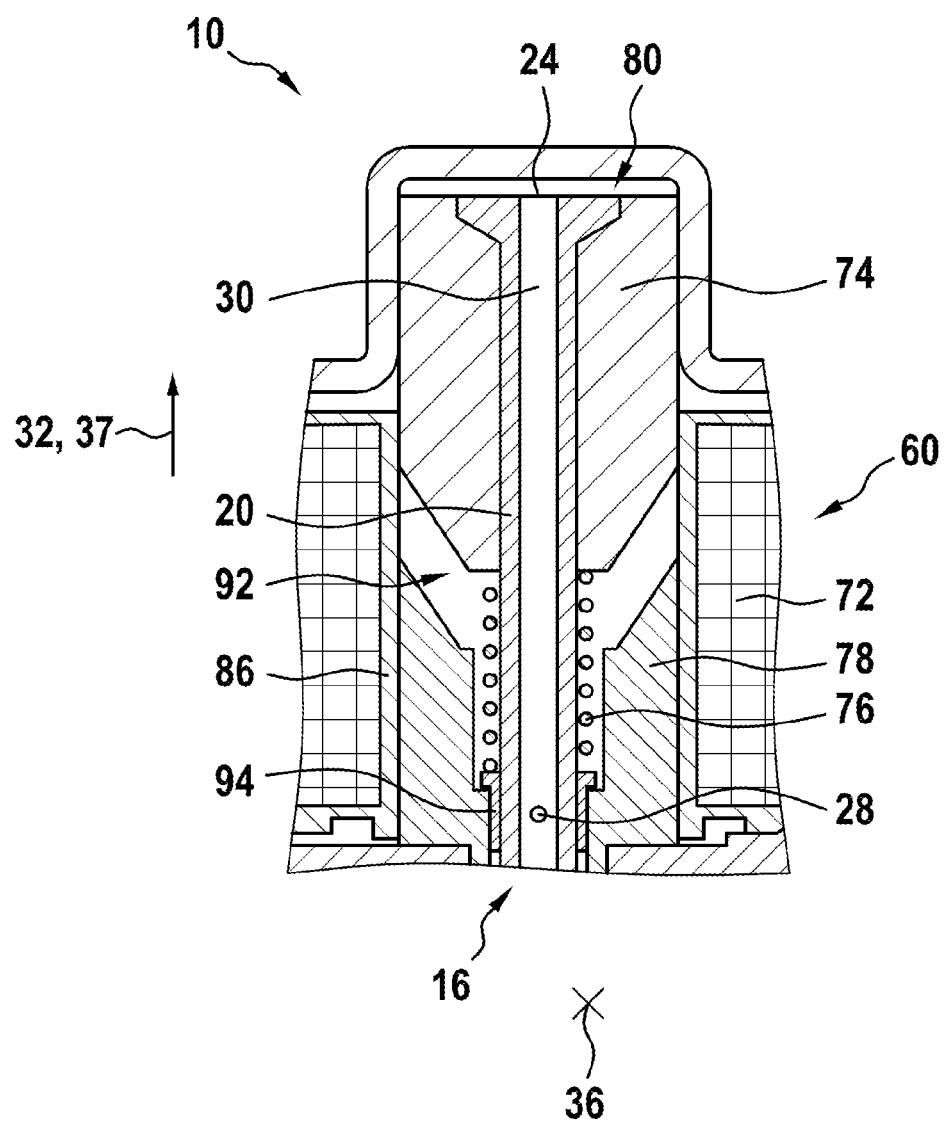
FIG. 4 shows a detail of an actuator unit of the valve device in an opened state in a schematic sectional illustration.

The actuator unit 60 comprises a drive element 72. The drive element 72 is formed as a coil. Furthermore, the actuator unit 60 comprises an armature 74. The actuating element 20 is connected to the armature 74. In the present case, the actuating element 20 is connected in positively locking fashion to the armature 74, such that it is advantageously the case that a pulling force and/or lifting force generated during a movement of the armature 74 can be transmitted to the actuating element 20 and to the valve body 18 as actuation force. In the present case, the armature 74 is formed as a solenoid armature. The actuator unit 60 is provided for generating the actuation force. The armature 74 is mounted so as to be movable along a longitudinal direction 37 of the actuating element 20. The actuator unit 60 comprises a sealing sleeve 86 for the armature 74. The armature 74 is mounted movably in the sealing sleeve 86. The longitudinal direction 37 of the actuating element 20 runs parallel to a main direction of extent of the actuating element 20. FIG. 4 furthermore shows a detail of the actuator unit 60 in the opened state in a schematic sectional illustration. For opening and/or partial opening, the armature 74 is moved, in particular by means of suitable actuation of the drive element 72, in the longitudinal direction 37 of the actuating element 20. The actuation force is generated in this way. The actuator unit 60 has a resetting element 76 which opposes a movement of the armature 74. In a non-actuated state, the resetting element 76 pushes the armature 74 against an armature seat 78. In the event of a deflection of the armature 74, for example during an opening process, the resetting element 76 is placed under stress, in particular is stretched. The resetting element 76 is in the present case formed as a spring element.

The first ventilation opening 24 opens into a rear interior region 80 of the actuator unit 60. The rear interior region 80 of the actuator unit 60 is, in the closed state, arranged behind the armature 74 as viewed from the throughflow region 12. The rear interior region 80 of the actuator unit 60 is at least partially delimited by the housing 62 of the actuator unit 60. An opening direction 32 of the first ventilation opening 24 is oriented parallel to the longitudinal direction 37 of the actuating element 20. In the closed state, the armature 74 is arranged outside the rear interior region 80 of the actuator unit 60. In the opens state, the armature 74 is arranged partially in the rear interior region 80 of the actuator unit 60. During a movement of the armature 74 into the rear interior region 80, for example during an opening process, a free volume between the armature 74 and the housing 62 of the actuator unit 60 is decreased in size.

The second ventilation opening 26 has an opening direction 34 which is oriented at an angle, in the present case perpendicular, with respect to the longitudinal direction 37 of the actuating element 20. The valve body 18 has a ventilation duct 82 which forms the second ventilation opening 26. The ventilation duct 82 is formed as a transverse bore. The ventilation duct 82 extends parallel to the opening direction 34 of the second ventilation opening 26. The ventilation duct 82 is connected to an interior space 84 of the valve body 18. The interior space 84 of the valve body 18 is of conical form.

The third ventilation opening 28 has an opening direction 36 which is oriented at an angle, in the present case perpendicular, with respect to the longitudinal direction 37 of the actuating element 20. In the present case, the opening direction 36 of the third ventilation opening 28 is arranged perpendicular to the opening direction 34 of the second ventilation opening 26. A parallel arrangement is however also conceivable. The third ventilation opening 28 opens, in the opens state, into a front interior region 92 of the actuator unit 60. In the closed state, the third ventilation opening 28 opens into a guide sleeve 94 of the actuator unit 60, which guide sleeve is provided for guiding the actuating element 20. The front interior region 92 of the actuator unit 60 is, in the opens state, arranged in front of the armature 74 as viewed from the throughflow region 12. The front interior region 92 of the actuator unit 60 is arranged behind the armature seat 78, and in particular in front of the rear interior region 80 of the actuator unit 60, as viewed from the throughflow region 12. The rear interior region 80 of the actuator unit 60 is arranged behind the armature seat 78, and in particular behind the front interior region 92 of the actuator unit 60, as viewed from the throughflow region 12. In the closed state, the armature 74 is arranged at least partially in the front interior region 92 of the actuator unit 60. During a closing process, the armature 74 is moved partially into the front interior region 92 of the actuator unit 60. In the process, a volume between the armature seat 78 and the armature 74 is decreased in size.

The actuating element 20 is pushed into a receiving region 88 of the valve body 18. The receiving region 88 is connected to the interior space 84 of the valve body 18. The valve body 18 has a shell element 90 which at least partially surrounds and/or defines the receiving region 88 and/or the interior space 84 of the valve body 18. The actuating element 20 is formed at least partially from plastic. The valve body 18 is formed at least partially from plastic. In the present case, the actuating element 20 and the valve body 18 are formed from plastic. The actuating element 20 is cohesively connected to the valve body 18. In the present case, the actuating element 20 is welded to the valve body 18 by ultrasound welding. A positively locking connection is alternatively or additionally also conceivable.

The actuating unit 16 has at least one duct 30 which connects at least two of the ventilation openings 24, 26, 28 to one another. In the present case, the duct 30 connects the first ventilation opening 24, the second ventilation opening 26 and the third ventilation opening 28 to one another. The second ventilation opening 26 is connected via the ventilation duct 82 and the interior space 84 of the valve body 18 to the duct 30. In the present case, the actuating element 20 has the duct 30. The duct 30 is formed as a longitudinal bore of the actuating element 20. The actuating element 20 is of at least substantially tubular form. In the closed state, the duct 30 connects the throughflow region 12 to the rear interior region 80 of the actuator unit 60. In the opens state, the duct 30 connects the throughflow region 12 to the front interior region 92 of the actuator unit 60. Furthermore, the duct 30 connects the front interior region 92 of the actuator unit 60 to the rear interior region 80 of the actuator unit 60, in particular during an opening and closing process. It is possible in particular for a volume exchange to take place through the duct 30, advantageously during a switching process. In particular, a drawing-in of particles and/or of sand can be reduced.

The valve device 10 has a spacing unit 38. The spacing unit 38 defines a spacing between the armature seat 78 and the valve seat 14. The spacing unit 38 has the valve seat 14. The spacing unit 38 has a spacing element 96 which is connected to the valve seat 14. Furthermore, the spacing unit 38 has a stop element 98 which is connected to the spacing element 96. The stop element 98 bears against the actuator unit 60 in an assembled state. In the present case, the stop element 98 is integrally connected to the spacing element 96. Furthermore, in the present case, the spacing element 96 is integrally connected to the valve seat 14. In the present case, the stop element 96 is of ring-shaped form. The spacing unit 38 is formed at least partially from plastic. In particular, the valve seat 14 and/or the stop element 98 and/or the spacing element 96 is formed from plastic.

A method for producing the valve device 10 will be described below. In the method, an arrangement of the actuating element 20 relative to the valve body 18 is set. In the present case, a position of the actuating element 20 relative to the valve body 18 parallel to the longitudinal direction 37 of the actuating element 20 is set. In the following figures, for the sake of clarity, some units, elements, regions, components and the like have not been provided with reference designations. In the method, a prefabricated assembly 40, which comprises at least the actuating element 20 and the actuator unit 60, is supplemented by a further assembly 42, which comprises at least the valve body 18 and the spacing unit 38, in the present case with the valve seat 14. The prefabricated assembly 40 may in this case be manufactured independently of the flow housing 44, and in particular used for different valves.

Figure 5:
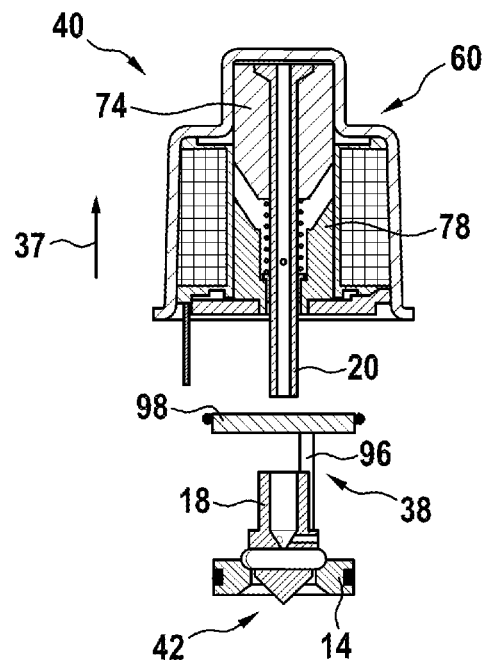
FIG. 5 shows the valve device in a first preassembled state in a schematic sectional illustration.

FIG. 5 shows the valve device 10 in a first preassembled state in a schematic sectional illustration. In the first preassembled state, the prefabricated assembly 40 and the further assembly 42 are oriented relative to one another. Subsequently, the actuating element 20 is pushed at least in sections into the valve body 18, in particular into the receiving region 88 of the valve body 18. For example, the further assembly 42 is pushed toward the prefabricated assembly 40.

Figure 6:
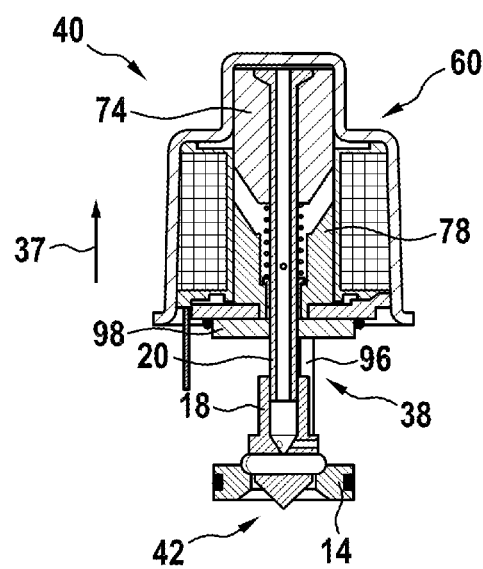
FIG. 6 shows the valve device in a second preassembled state in a schematic sectional illustration.

FIG. 6 shows the valve device 10 in a second preassembled state in a schematic sectional illustration. In the second preassembled state, the actuating element 20 has been partially pushed into the valve body 18. The spacing unit 38 is pushed forward until it bears against the actuator unit 60, in particular by means of the stop element 98. In the second preassembled state, a spacing between the valve seat 14 and the actuator unit 60, in particular between the valve seat 14 and the armature seat 78, is defined by the spacing unit 38. In particular, the armature 74 is arranged correspondingly in the second preassembled state, in the opens state or in a partially opens state.

Figure 7:
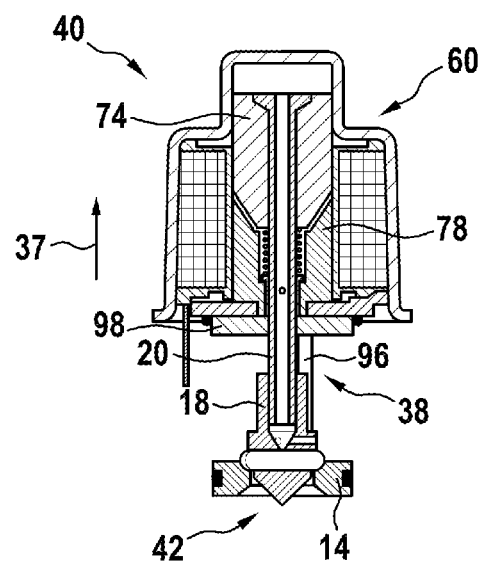
FIG. 7 shows the valve device in a third preassembled state in a schematic sectional illustration.

FIG. 7 shows the valve device 10 in a third preassembled state in a schematic sectional illustration. In particular, proceeding from the second preassembled state, the actuating element 20 is set relative to the valve body 18 by means of the spacing unit 38. The actuating element 20 is pushed forward until it reaches a final fastening position relative to the valve body 18 whilst the stop element 98 bears against the actuator unit 60. The valve body 18 is arranged in the valve seat 14 whilst the arrangement of the actuating element 20 relative to the valve body 18 is set. Setting of the arrangement of the actuating element 20 relative to the valve body 18 is performed by virtue of the armature 74 being pushed forward into the armature seat 78. Owing to the simultaneous arrangement of the valve body 18 in the valve seat 14, a spacing setting for the closed state can be performed in this way. In this way, tolerances and/or different lengths of the spacing element 96 can be compensated, in particular by virtue of the actuating element 20 being pushed forward until the armature 74 is arranged in the armature seat 78 whilst the valve body 18 is, correspondingly to the closed state, arranged in the valve seat 14.

Furthermore, the actuating element 20 and the valve body 18 are cohesively connected to one another. As mentioned, it is alternatively or additionally conceivable for the actuating element 20 and the valve body 18 to be connected to one another in positively locking fashion. In particular, a connection of the actuating element 20 and of the valve body 18 is performed after the setting of the arrangement of the actuating element 20 relative to the valve body 18. Thus, in particular, the setting of a residual spacing is made possible without setting of a position of the actuating element 20 relative to the armature 74. In the present case, the actuating element 20 and the valve body 18 are connected to one another by means of ultrasound welding. In particular, here, the shell element 90 of the valve body 18 is connected to the actuating element 20.

Figure 8:
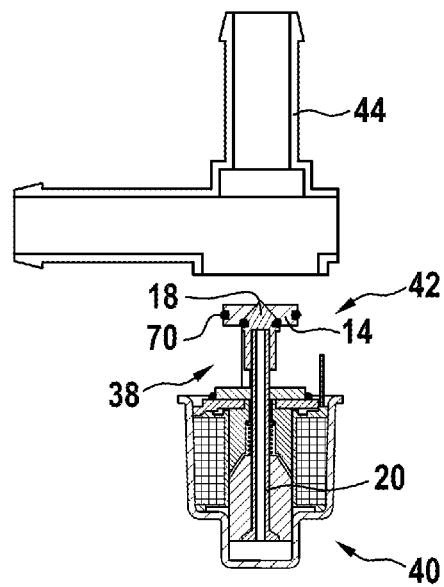
FIG. 8 shows the valve device in a fourth preassembled state in a schematic sectional illustration.

FIG. 8 shows the valve device 10 in a fourth preassembled state in a schematic sectional illustration. The prefabricated assembly 40 and the further assembly 42 are connected to one another in particular after the connection of the valve body 18 to the actuating element 20. The spacing unit 38, the valve body 18 and the actuating element 20 are, in a preassembled state, jointly pushed at least partially into the flow housing 44 of the valve device 10. During the pushing-in process, the valve seat 14 is arranged in the flow housing 44. Here, the spacing unit 38 effects correct positioning of the valve seat 14 relative to the actuating unit 16. The valve seat 14 is sealingly connected by means of the further sealing element 70 to the flow housing 44. Manufacturing tolerances can be advantageously easily compensated, in particular because the setting of a residual spacing is performed by means of the spacing unit 38 and independently of the flow housing 44.

Owing to the setting of the arrangement of the actuating element 20 relative to the valve body 18 outside the flow housing 44 and/or independently of the geometry of said flow housing, it is advantageously possible for the prefabricated assembly 40 to be combined with different flow housings and/or different spacing units and/or valve bodies, whereby, in particular, a high level of cost-effectiveness can be achieved.

Figure 9:
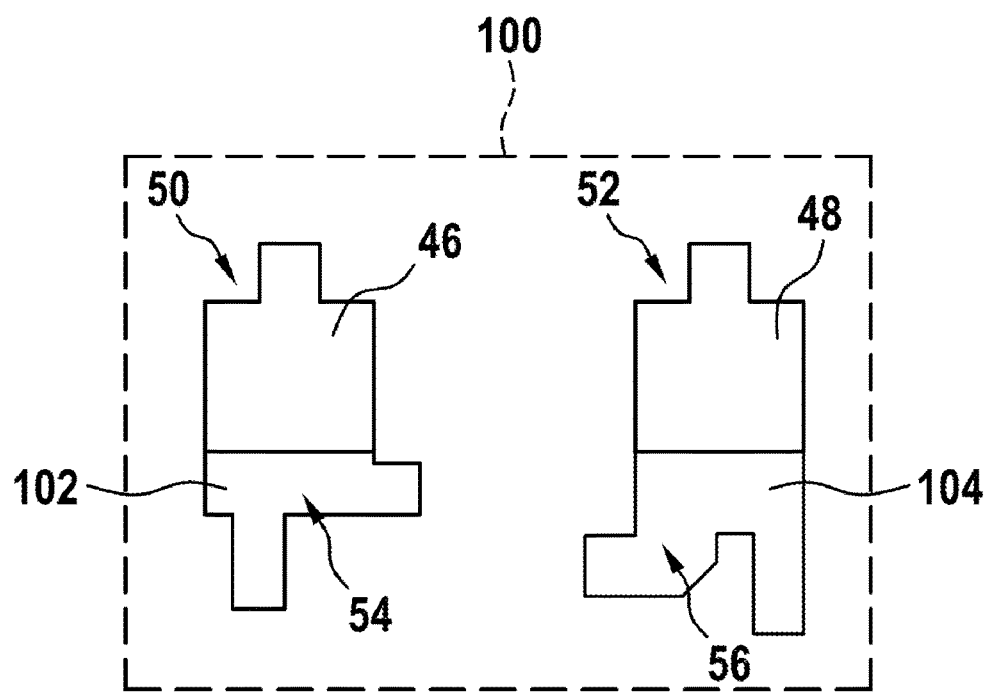
FIG. 9 shows a set composed of a first valve and a second valve in a schematic illustration.

FIG. 9 shows a set 100 composed of a first valve 46 and a second valve 48 in a schematic illustration. The first valve 46 and the second valve 48 are formed in each case as a valve according to the invention with a valve device according to the invention, which is designed in particular analogously to the valve device 10 shown. The first valve 46 and the second valve 48 have in each case one first assembly 50, 52, which comprises at least one actuating element (not shown). In the present case, the first assemblies 50, 52 correspond to the prefabricated assembly 42. The first assemblies 50, 52 are of at least substantially identical form. In particular, the first assemblies 50, 52 are structurally identical. The first valve 46 and the second valve 48 have in each case one second assembly 54, 56, which has at least one valve seat (not shown) and at least one valve body (not shown). In the present case, the second assemblies 54, 56 are, correspondingly to the further assembly 42, formed so as to each comprise a spacing unit (not shown). The second assemblies 54, 56 are of different form. For example, the second assemblies 54, 56 may have different spacing units and/or valve seats and/or valve bodies. In particular, the first valve 46 and the second valve 48 have different flow housings 102, 104.

According to a further aspect, the valve body 18 may also have a substantially encircling groove for receiving the sealing element 68. FIG. 3 shows the valve body 18 with installed sealing element 68. The sealing element 68 is attached to the valve body 18. The sealing element 68 may be attached in the, in particular fully, encircling groove of the valve body 18. The sealing element 68 may be situated only partially within the groove in a radial direction.

The valve device, in particular solenoid valve device, comprises at least one valve seat 14 and at least one actuating unit 16, which at least one actuating unit has at least one valve body 18 and at least one actuating element 20 which is provided for transmitting an actuation force to the valve body 18. According to the further aspect, the valve device is characterized in that the valve body 18 has a groove and in that a sealing element 68 is arranged at least partially within the groove, wherein the groove has a trapezoidal shape in cross section. The opening or the width of the groove increases in a radial direction. The groove is of trapezoidal form in cross section. The groove base is formed substantially parallel to the longitudinal axis of the valve device 10. At least one of the groove walls runs obliquely with respect to the groove base. The angle between groove base and groove walls is formed so as to lie between 90 degrees and 150 degrees, preferably 100 to 150 degrees. In the assembled state, the sealing element 68 bears against the groove base and against both groove walls. Owing to the oblique form of the groove walls, load peaks are lower. Owing to the oblique form of the groove walls, the sealing element 68 does not press against the encircling edge, formed on the radially outer end, of the valve body 18.

According to a further aspect, the groove walls have a part running obliquely with respect to the groove base and, radially further to the outside, a part running perpendicular to the groove base. The groove walls have an angled configuration.

According to a further aspect, the valve body 18 is adjoined, at least one of the groove walls, in particular radially at the outside, by a region running parallel to the groove base. Adjacent to the region, the valve body 18 is formed as a truncated cone or as a cone tip. The truncated cone or the cone tip is formed such that it can be inserted into the valve seat 14. The sealing element 68 is provided for permitting a sealing seat of the valve body 18 in the valve seat 14.

The sealing element 68 may be formed in particular as a sealing ring with an elliptical cross section. For the installation of the sealing element 68, the latter is expanded.

The further aspects presented above may, with regard to the sealing element 68 and the substantially encircling groove, be correspondingly transferred to all of the embodiments of the valve bodies 18 described in the context of this application.

What is claimed is:

1. A valve device having at least one throughflow region (12), having at least one valve seat (14) and having an actuating unit (16) which has at least one valve body (18), at least an actuating element (20) for transmitting an actuation force to the valve body (18), and at least one first ventilation opening (24) arranged outside a fluid contact region (22) of the actuating element (20), wherein the fluid contact region of the actuating element is a section of the actuating element in contact with fluid flowing through the throughflow region, characterized in that the actuating unit (16) has at least one second ventilation opening (26, 28) arranged outside the fluid contact region (22) of the actuating element (20), wherein the valve body (18) has the second ventilation opening (26), wherein the actuating element (20) is at least substantially of tubular form.

2. The valve device according to claim 1, characterized in that the actuating unit (16) has at least one third ventilation opening (28) arranged outside the fluid contact region (22) of the actuating element (20).

3. The valve device according to claim 2, characterized in that the actuating unit (16) has at least one duct (30) which connects at least two of the ventilation openings (24, 26, 28) to one another.

4. The valve device according to claim 1, characterized in that the actuating element (20) is at least partially formed from plastic.

5. The valve device according to claim 1, characterized in that the actuating element (20) is connected cohesively to the valve body (18).

6. The valve device according to claim 1, characterized in that an opening direction (32, 34, 36) of at least one of the ventilation openings (24, 26, 28) is oriented at right angles to a longitudinal direction (37) of the actuating element (20).

7. The valve device according to claim 1, wherein the valve device is a solenoid valve device.

8. A valve having at least one valve device (10) according to claim 1.

9. A valve device according to claim 1, characterized in that the actuating unit (16) has a duct (30) which extends through the actuating element (20) and which connects the first ventilation opening and the second ventilation opening.

* * * * *